(12) United States Patent
Han et al.

(10) Patent No.: US 8,793,134 B2
(45) Date of Patent: Jul. 29, 2014

(54) SYSTEM AND METHOD FOR INTEGRATING GESTURE AND SOUND FOR CONTROLLING DEVICE

(75) Inventors: Mun Sung Han, Daejeon (KR); Young Giu Jung, Seoul (KR); Hyun Kim, Daejeon (KR); Jae Hong Kim, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 257 days.

(21) Appl. No.: 13/333,773

(22) Filed: Dec. 21, 2011

(65) Prior Publication Data

US 2012/0166200 A1 Jun. 28, 2012

(30) Foreign Application Priority Data

Dec. 23, 2010 (KR) .................. 10-2010-0134081

(51) Int. Cl.
*G06F 3/00* (2006.01)
(52) U.S. Cl.
USPC .......................................................... 704/270
(58) Field of Classification Search
USPC .......................................................... 704/270
See application file for complete search history.

(56) References Cited

U.S. PATENT DOCUMENTS 6,964,023 B2 * 11/2005 Maes et al. .................... 715/811

FOREIGN PATENT DOCUMENTS

KR 1020090128187 12/2009

OTHER PUBLICATIONS

Jylha, Antti et al., "A Hand Clap Interface for Sonic Interaction with the Computer," CHI 2009—Interactivity—Touch & Feel, pp. 3175-3180 (2009).

* cited by examiner

*Primary Examiner* — Susan McFadden
(74) *Attorney, Agent, or Firm* — Nelson Mullins Riley & Scarborough LLP; Anthony A. Laurentano, Esq.; Lewis Lee, Esq.

(57) ABSTRACT

Disclosed is a system for integrating gestures and sounds including: a gesture recognition unit that extracts gesture feature information corresponding to user commands from image information and acquires gesture recognition information from the gesture feature information; a background recognition unit acquiring background sound information using the predetermined background sound model from the sound information; a sound recognition unit that extracts the sound feature information corresponding to user commands from the sound information and extracts the sound feature information based on the background sound information and acquires the sound recognition information from the sound feature information; and an integration unit that generates integration information by integrating the gesture recognition information and the sound recognition information.

13 Claims, 4 Drawing Sheets

SYSTEM AND METHOD FOR INTEGRATING GESTURE AND SOUND FOR CONTROLLING DEVICE

CROSS-REFERENCE TO RELATED APPLICATIONS

This application claims priority to and the benefit of Korean Patent Application NO. 10-2010-0134081 filed in the Korean Intellectual Property Office on Dec. 23, 2010, the entire contents of which are incorporated herein by reference.

TECHNICAL FIELD

The present invention relates to a user interface for controlling devices such as a TV, audio, a robot, or the like, and more particularly, to a system and a method for recognizing gestures and a sounds capable of integrating gestures and sounds (clapping, flicking, whistling, or the like) generated by persons under noisy environments and recognizing background sounds by modeling the background sounds

BACKGROUND ART

In recent years, various interfaces for controlling various devices such as a TV, audio, a robot, or the like, have been developed and a demand of an interface capable of allowing a user to control devices without using any apparatus has increased.

In order to satisfy the demand of the user interface, researches into an image based gesture recognition technology or an interface using voices or sounds have been conducted. In particular, researches for controlling various devices by recognizing sounds generated by persons have progressed. However, the existing researches may have less recognition rate and low performance due to various noisy environments.

SUMMARY OF THE INVENTION

The present invention has been made in an effort to provide a system and a method for integrating gestures/sounds capable of integrating gestures of users and sounds generated by users under noisy environments Further, the present invention has been made in an effort to integrate gestures and sounds by accurately detecting a sound command section so as to integrate gestures and sounds and effectively modeling background sounds so as to obtain high performance even in noisy environments.

An exemplary embodiment of the present invention provides a system for integrating gestures and sounds, including: a gesture recognition unit that extracts gesture feature information corresponding to user commands from image information and acquires gesture recognition information from the gesture feature information; a sound recognition unit that extracts sound feature information corresponding to user commands in a sound section selected by using the gesture recognition information from sound information and acquires sound recognition information from the sound feature information; and an integration unit that generates integration information by integrating the gesture recognition information and the sound recognition information.

The system for integrating gestures and sounds may further include a background sound model that collects background sounds, extracts the sound feature information of the collected background sounds, and classifies and models the background sounds based on the extracted sound feature information, wherein the sound recognition unit acquires the background sounds and the sound recognition information by using the background sound model and the sound model.

The gesture recognition unit may include: a human detection module that detects and tracks a part of the human body from the image information; a gesture feature extraction module that extracts gesture feature information from detection and tracking results of the human detection module; and a gesture recognition module that acquires gesture recognition information from the gesture feature information.

The system for integrating gestures and sounds may further include a synchronization unit that synchronizes a sound frame of the sound information with an image frame of the image information.

The synchronization unit may select a sound command candidate section based on a point in time when the gestures are first recognized in the sound frame and the sound recognition unit may extract the sound feature information within the sound command candidate section.

The synchronization unit may select a predetermined section from a point in time when the gestures are first recognized as the sound command candidate section.

The synchronization unit may select as the sound command candidate section the predetermined section from a point in time after a predetermined time of the point in time when the gestures are first recognized.

The sound recognition unit may include: a dynamic end point detection (EPD) module that moves windows in a frame unit within the sound command candidate section; a sound feature extraction module that extracts sound features for each moved window and extracts a sound command section and the sound feature information using probability information corresponding to each sound feature and a previously built EPD probability model; and a sound recognition module that acquires the sound recognition information from the sound feature information.

The sound recognition module may acquire the sound recognition information based on the previously built sound model.

Another exemplary embodiment of the present invention provides a method for integrating gestures and sounds, including: extracting gesture feature information corresponding to user commands from image information and acquiring gesture recognition information from the gesture feature information; extracting sound feature information corresponding to user commands in a sound section selected by using the gesture recognition information from sound information and acquiring sound recognition information from the sound feature information; and generating integration information by integrating the gesture recognition information and the sound recognition information.

The method for integrating gestures and sounds may further include selecting a sound command candidate section based on a point in time when the gestures are first recognized in the sound frame of the sound information, and the acquiring of the sound recognition information may extract the sound feature information within the sound command candidate section.

The acquiring of the sound recognition information may include: extracting sound features for each moved window while moving windows in a frame unit within the sound command candidate section and extracting a sound command section and the sound feature information by using probability information corresponding to each sound feature and a previously built end point detection (EPD) probability model; and acquiring the sound recognition information from the sound feature information.

The acquiring of the sound recognition information may acquire background sounds and the sound recognition information using the previously built background sound model and the sound model.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
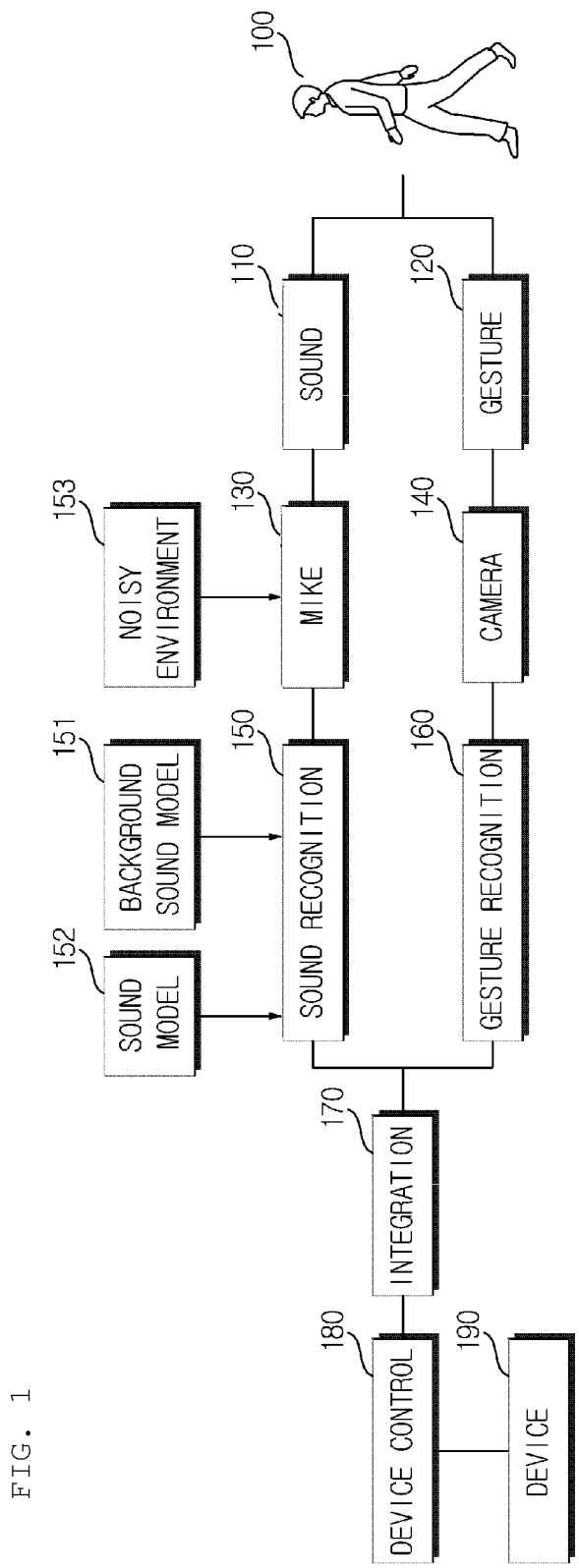
FIG. 1 is a diagram showing a concept of a system for integrating gestures and sounds according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

FIG. 1 is a diagram showing a concept of a system for integrating gestures and sounds according to an exemplary embodiment of the present invention.

The system for integrating gestures and sounds according to an exemplary embodiment of the present invention integrates commands by gestures of persons and sounds generated by persons to control devices using control commands generated by the recognition results. In this case, the gestures are specific operations of a person made using a part of the body such as arms, legs, or the like and sounds generated by persons are sounds generated using a part of the human body such as clapping, whistling, flicking, or the like.

Referring to FIG. 1, a user 100 provides his/her own desired commands to a device 190 by a gesture 120 and a sound 110. For example, if it is assumed that a device 190 is a TV, a user may make gestures indicating one of the channel buttons displayed in a TV screen and generates sounds by flicking to give a command selecting the corresponding channel. The gestures made by the user 100 are photographed by a camera 140 and the sounds generated by the user 100 are input to a mike 130.

When the user 100 gives commands using the gestures and the sounds, gesture recognition 160 acquires gesture recognition information from image information of the camera 140 and sound recognition 150 acquires sound recognition information from sound information of the mike 130.

Meanwhile, various noisy environments 153 occur around the user 100 and the device 190. Herein, noises include all the sounds other than a sound command 110 of the user 100. An example of noises may include voices of persons, mechanical sounds, a sound generated when a door is opened and closed, a rap on the desk, a sound generated from TV, or the like. The sound command 110 of the user 100 and the above-mentioned noises are input to the mike 130.

Therefore, the sound recognition 150 acquires the sound recognition information from the input sound information based on a sound model 152, and in particular, recognizes the background sound from the sound information and acquires the sound recognition information by using the gesture recognition information and a background sound model 151.

The sound recognition information and the gesture recognition information are recognized as one user command through integration 170. Further, a device control 180 controls the device 190 using the corresponding user command.

Figure 2:
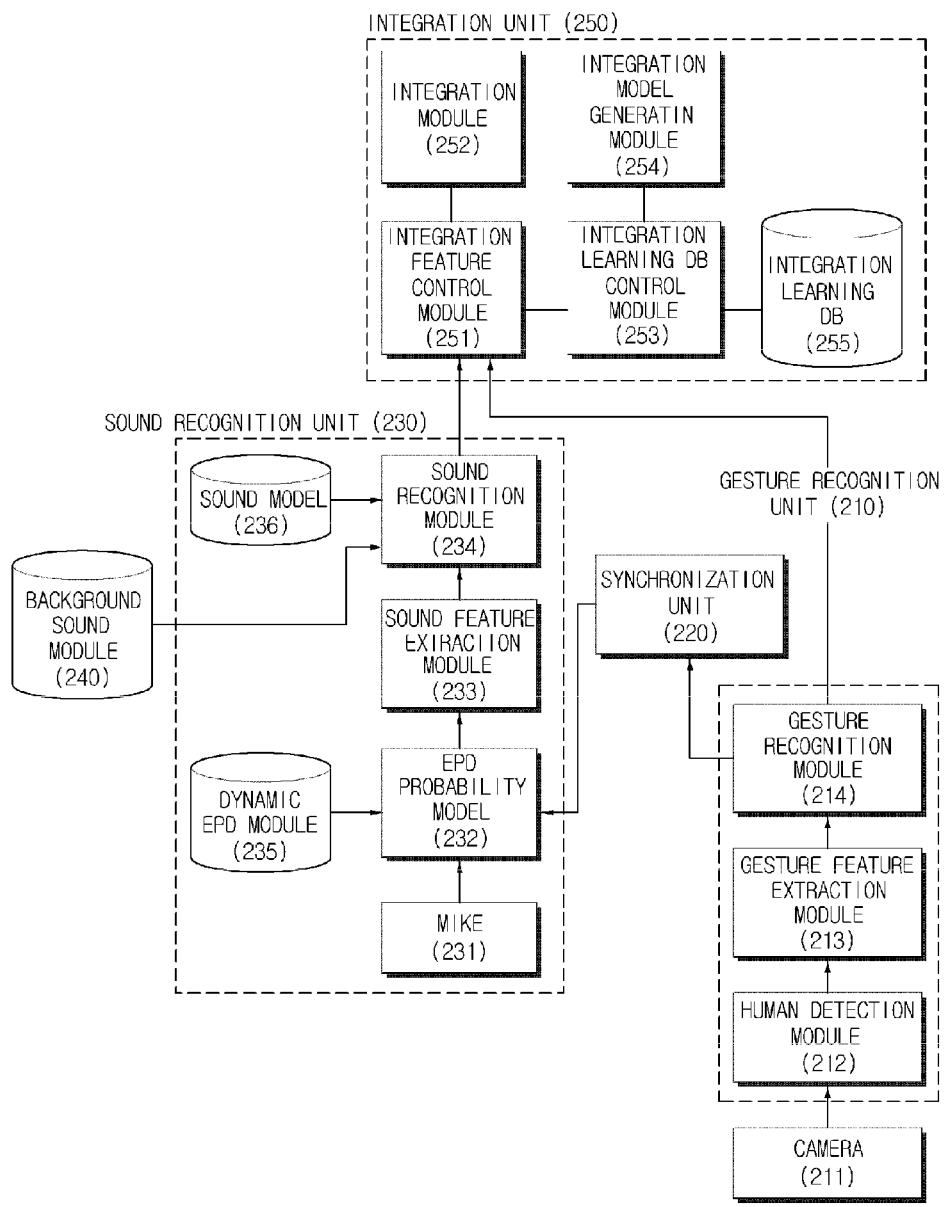
FIG. 2 is a diagram showing a configuration of a system for integrating gestures and sounds according to an exemplary embodiment of the present invention.

FIG. 2 is a diagram showing a configuration of a system for integrating gestures and sounds according to an exemplary embodiment of the present invention.

A system for integrating gestures and sounds according to an exemplary embodiment of the present invention is configured to include a gesture recognition unit 210 that extracts gesture feature information corresponding to user commands from image information acquired by a camera 211 and acquires gesture recognition information from the gesture feature information, a sound recognition unit 230 that extracts sound feature information corresponding to user commands from sound information acquired by a mike 231 and acquires sound recognition information from the sound feature information, a background sound model 240 collecting, classifying, and modeling background sounds, a synchronization unit 220 that synchronizes an image frame of the image information with a sound frame of the sound information, and an integration unit 250 that generates integration information by integrating the gesture recognition information from the gesture recognition unit 210 and the sound recognition information from the sound recognition unit 230.

The gesture recognition unit 210 is configured to include a human detection module 212, a gesture feature extraction module 213, and a gesture recognition module 214.

The human detection module 212 detects and tracks a part of the human body that becomes a means of the gesture command from the image information captured by the camera 211. In the exemplary embodiment, the human detection module 212 detects a face and hands from the images captured by the camera 211 and continuously tracks a motion of the detected face and hands. The human detection module 212 may detect and track other parts of the body that may become means of the gesture commands as well as the face and the hands.

The gesture feature extraction module 213 extracts the gesture feature information from the detection and tracking results of the human detection module 212. For example, the gesture feature extraction module 213 extracts meaningful motion information by analyzing the motion of the detected hands and stores the image frame corresponding to the corresponding motion.

The gesture recognition module 214 acquires the gesture recognition information from the gesture feature information. For example, the gesture recognition module 214 determines motion types corresponding to motion information extracted from the gesture feature extraction module 213 based on the pre-stored motion type information so as to be output as the gesture recognition information.

The synchronization unit 220 synchronizes the image frame of the image information with the sound frame of the sound information and selects a sound command candidate section based on a point in time when a gesture is first recognized in the sound frame. For example, when the specific motion of the user's hands is recognized as the gestures in the image information, the sound command candidate section is selected from the sound frame based on a point in time of the sound frame corresponding to a point in time when the corresponding motion starts in the image frame. A length of the sound command candidate section is selected to be longer than a time length of general sound commands (clapping, whistling, and flicking).

The synchronization of the image frame and the sound frame is required because there is a difference between an image frame processing speed and a sound frame processing speed. In addition, it is difficult to find the sound command section from the sound frame. Therefore, in the exemplary embodiment of the present invention, the sound command candidate section that may be considered as including the sound command section based on the point in time when the gesture is first recognized is selected under the assumption that a person first makes gestures and then, the sound command is generated.

The synchronization unit 220 may select a predetermined section as the sound command candidate section from the point in time when the gestures are first recognized in the sound frame. This is considered that there is the sound command section in the predetermined section from the point in time when the gestures start. The synchronization unit 220 may select the sound command candidate section the predetermined section from the point in time after the predetermined time of point in time when the gestures are first recognized in the sound frame. This is considered that the sound command is slightly delayed from a start point in time of the gesture and from that time, the sound command section is present in the predetermined section.

A reference of selecting the sound command candidate section of the synchronization unit 220 may be appropriately defined according to the gesture and sound command types to be received and physical and body features of a person issuing the corresponding gesture/sound commands.

The sound recognition unit 230 is configured to include a dynamic end point detection module 232, a sound feature extraction module 233, a sound recognition module 234, an EPD probability module 235, and a sound model 236.

The EPD probability model 235 is a probability model storing as probability distribution positions of a start point and an end point of the sound command section, that is, a start point and an end point of the sound corresponding to the user command based on the gesture recognition point in time. The sound model 236 is a database that models and stores the sound features corresponding to the previously defined sound command.

The dynamic EPD module 232 moves a window having a predetermined size or several sizes within the sound command candidate section selected from the synchronization unit 220 in one frame unit or several frame units. The sound feature extraction module 233 extracts the sound features for each window moved by the dynamic EPD module 232 and obtains the probability information corresponding thereto. Further, the optimal sound command section and the sound feature information included therein are extracted by using the probability information and the EPD probability model 235. As the optimal sound command section, the section corresponding to a window having the highest probability among each window may be extracted. The sound feature information may be, for example, frequency information, strength information, and pitch information of sound that are generated by the users.

Figure 3:
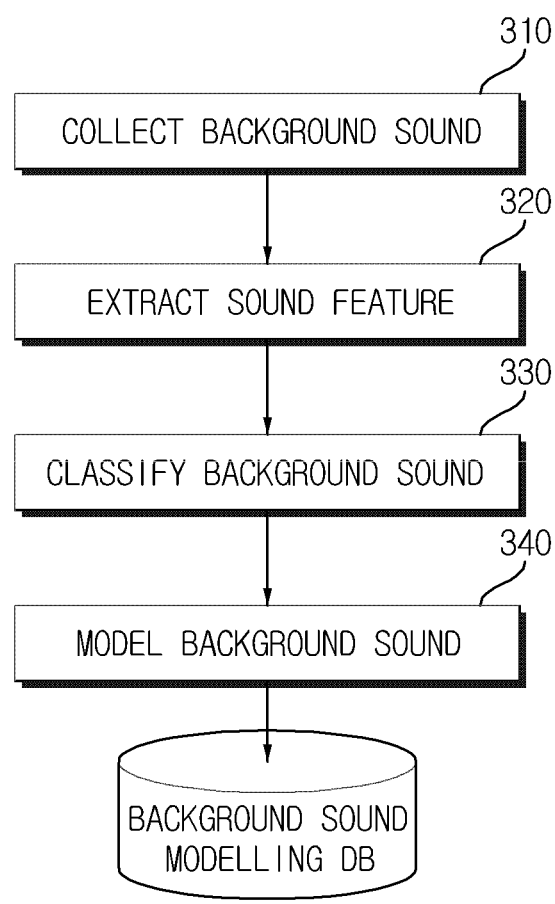
FIG. 3 is a diagram showing a detailed example of a process of building a background sound model 243.

The background sound model 240 is a database that collects the background sound, extracts the sound feature information of the collected background sound and is modeled by classifying the background sounds based on the extracted sound feature information. FIG. 3 is a diagram showing a detailed example of a process of building a background sound model 240. Referring to FIG. 3, the background sounds generated in various domains are collected (S310) and the sound features are extracted from the collected background sounds (S320). Next, learning data are generated by classifying the background sounds using a sound feature clustering algorithm (S330) and each background sound is modeled so as to be built as the background sound modeling database.

The sound recognition module 234 recognizes the background sounds using the background sound model 240 and acquires the sound recognition information from the sound feature information based on the sound model 236. For example, the sound type corresponding to the frequency information, the strength information, and the pitch information of sound is determined based on the sound model 236 and is output as the sound recognition information.

The integration unit 250 is configured to include an integration feature control module 251, an integration module 252, an integration learning DB control module 253, an integration model generation module 254, and an integration learning DB 255.

The integration model generation module 254 generates the integration model for effectively integrating the gesture recognition information and the sound recognition information base on the learning model.

In order to determine a high-performance integration model, various learning algorithms (hidden Markov model (HMM), neural network (NN), dynamic time warping (DTW), or the like) may be implemented and determined by an experiment. The integration learning DB 255 builds the integration database in a type appropriate for the development of the integration algorithm based on a statistical model. The integration DB control module 253 interworks with the integration model generation module 254 to generate learning parameters based on the previously generated and stored integration learning DB 255. The integration feature control module 251 controls the learning parameters, the gesture recognition information, and the sound recognition information that are generated by the integration learning DB control module 253. The integration module uses the control results by the integration feature control module 251 to generate the integration information.

Figure 4:
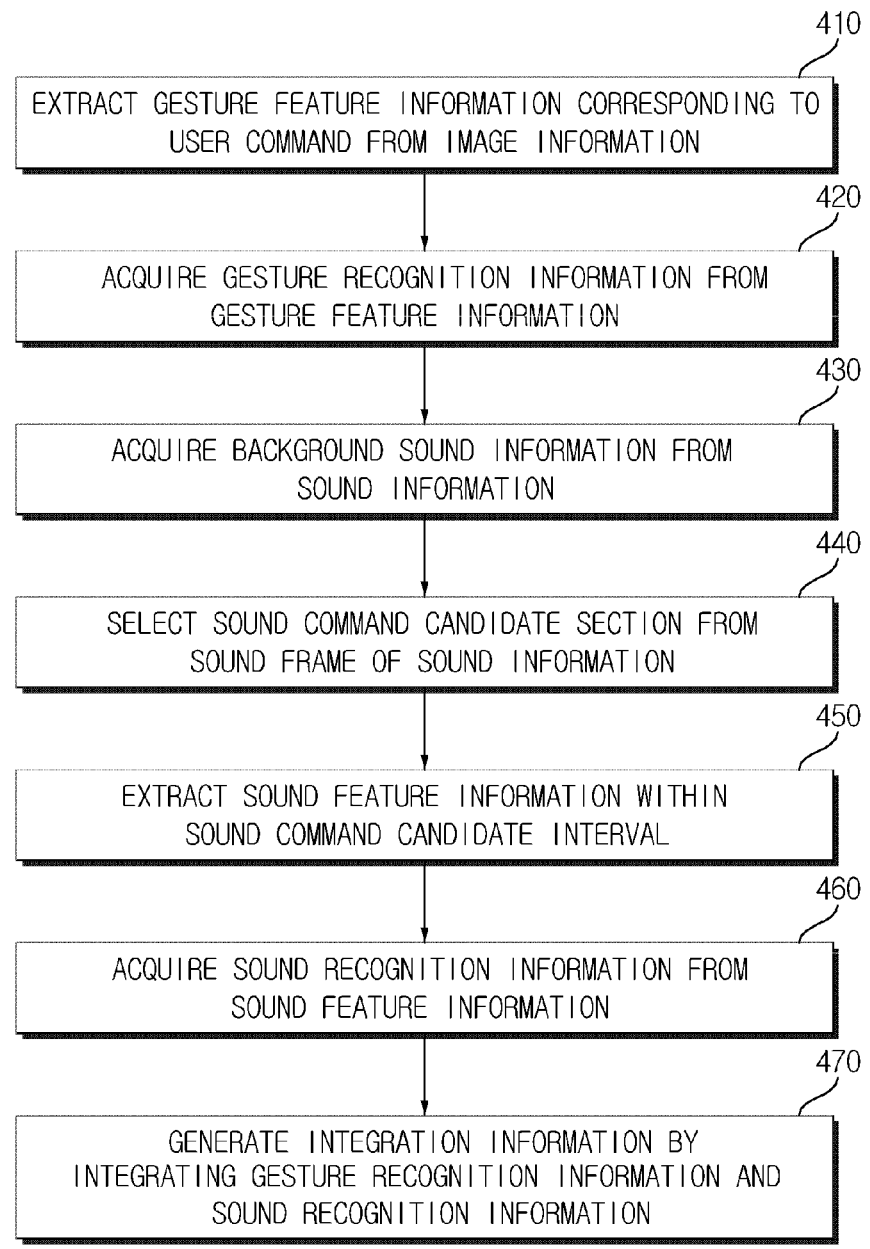
FIG. 4 is a flowchart showing a method for integrating gestures and sounds according to an exemplary embodiment of the present invention.

FIG. 4 is a flowchart showing a method for integrating gestures and sounds according to an exemplary embodiment of the present invention. The method for integrating gestures and sounds according to the exemplary embodiment of the present invention includes processes processed in the system for integrating gestures and sounds described above. Therefore, although the contents are omitted below, the contents described above with reference to the system for integrating gestures and sounds may also be applied to the method for integrating gestures and sounds according to the exemplary embodiment of the present invention.

The gesture recognition unit 210 extracts the gesture feature information corresponding to the user command from the image information obtained by the camera 211 (S410) and acquires the gesture recognition information from the gesture feature information (S420).

The synchronization unit 220 selects the sound command candidate section based on the point in time when the gesture is first recognized in the sound frame of the sound information obtained by the mike 231 (S440).

The sound recognition unit 230 extracts the sound feature information within the sound command candidate section (S450). In this case, the sound recognition unit 230 extracts the sound features for each moved window while moving the window in the frame unit within the sound command candidate section and extracts the sound command section and the sound feature information by using the probability information corresponding to each sound feature and the previously built end point detection (EPD) probability model 235.

The sound recognition module 230 recognizes the background sounds using the background sound model 240 and acquires the sound recognition information from the sound feature information using the sound model 236 (S460).

When the gesture recognition information and the sound recognition information are acquired, the integration unit 250 integrates the gesture recognition information and the sound recognition information to generate the integration information (S470).

Meanwhile, the above-mentioned exemplary embodiments of the present invention may be created by computer executable programs and may be implemented by a general purpose digital computer operating the programs using a computer readable recording medium. The computer readable recording medium includes a storage medium such as a magnetic storage medium (for example, ROM, floppy disk, hard disk, or the like), an optical reading medium (for example, CD-ROM, DVD, or the like), and a carrier wave (for example, transmission through Internet).

As set forth above, the exemplary embodiments of the present invention can provide the system and method for integrating gestures/sounds capable of integrating the gestures of users and the sounds generated by users under the noisy environments.

The exemplary embodiments of the present invention can accurately detect the sound command section so as to integrating the gestures and sounds and effectively perform sound recognition by using the background sound model even in the noisy environments As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for integrating gestures and sounds, comprising one or more processors configured to embody a plurality of functionalities including:
    a gesture recognition unit that extracts gesture feature information corresponding to user commands from image information and acquires gesture recognition information from the gesture feature information;
    a sound recognition unit that extracts sound feature information corresponding to user commands in a sound section selected by using the gesture recognition information from sound information and acquires sound recognition information from the sound feature information; and
    an integration unit that generates integration information by integrating the gesture recognition information and the sound recognition information.

2. The system of claim 1, further comprising a background sound model that collects background sounds, extracts the sound feature information of the collected background sounds, and classifies and models the background sounds based on the extracted sound feature information,
    wherein the sound recognition unit acquires the background sounds and the sound recognition information by using the background sound model and the sound model.

3. The system of claim 1, wherein the gesture recognition unit includes:
    a human detection module that detects and tracks a part of the human body from the image information;
    a gesture feature extraction module that extracts gesture feature information from detection and tracking results of the human detection module; and
    a gesture recognition module that acquires gesture recognition information from the gesture feature information.

4. The system of claim 1, further comprising a synchronization unit that synchronizes a sound frame of the sound information with an image frame of the image information.

5. The system of claim 4, wherein the synchronization unit selects a sound command candidate section based on a point in time when the gestures are first recognized in the sound frame, and
    the sound recognition unit extracts the sound feature information within the sound command candidate section.

6. The system of claim 5, wherein the synchronization unit selects a predetermined section from a point in time when the gestures are first recognized as the sound command candidate section.

7. The system of claim 5, wherein the synchronization unit selects as the sound command candidate section the predetermined section from a point in time after a predetermined time of the point in time when the gestures are first recognized.

8. The system of claim 5, wherein the sound recognition unit includes:
    a dynamic end point detection (EPD) module that moves windows in a frame unit within the sound command candidate section;
    a sound feature extraction module that extracts sound features for each moved window and extracts a sound command section and the sound feature information using probability information corresponding to each sound feature and a previously built EPD probability model; and a sound recognition module that acquires the sound recognition information from the sound feature information.

9. The system of claim 8, wherein the sound recognition module acquires the sound recognition information based on the previously built sound model.

10. A method for integrating gestures and sounds, wherein the method is performed by one or more processors, comprising:

extracting gesture feature information corresponding to user commands from image information and acquiring gesture recognition information from the gesture feature information;

extracting sound feature information corresponding to user commands in a sound section selected by using the gesture recognition information from sound information and acquiring sound recognition information from the sound feature information; and generating integration information by integrating the gesture recognition information and the sound recognition information.

11. The method of claim 10, further comprising selecting a sound command candidate section based on a point in time when the gestures are first recognized in the sound frame of the sound information, and wherein the acquiring of the sound recognition information extracts the sound feature information within the sound command candidate section.

12. The method of claim 11, wherein the acquiring of the sound recognition information includes:

extracting sound features for each moved window while moving windows in a frame unit within the sound command candidate section and extracting a sound command section and the sound feature information by using probability information corresponding to each sound feature and a previously built end point detection (EPD) probability model; and acquiring the sound recognition information from the sound feature information.

13. The method of claim 10, wherein the acquiring of the sound recognition information acquires background sounds and the sound recognition information using the previously built background sound model and the sound model.

* * * * *